Nov. 15, 1960 L. P. MARTUCH 2,960,063
STRIPPING APPARATUS
Filed July 28, 1958 2 Sheets-Sheet 1

INVENTOR.
LEON MARTUCH
BY
Dean Laurence
ATTORNEY

Nov. 15, 1960 L. P. MARTUCH 2,960,063
STRIPPING APPARATUS
Filed July 28, 1958 2 Sheets-Sheet 2
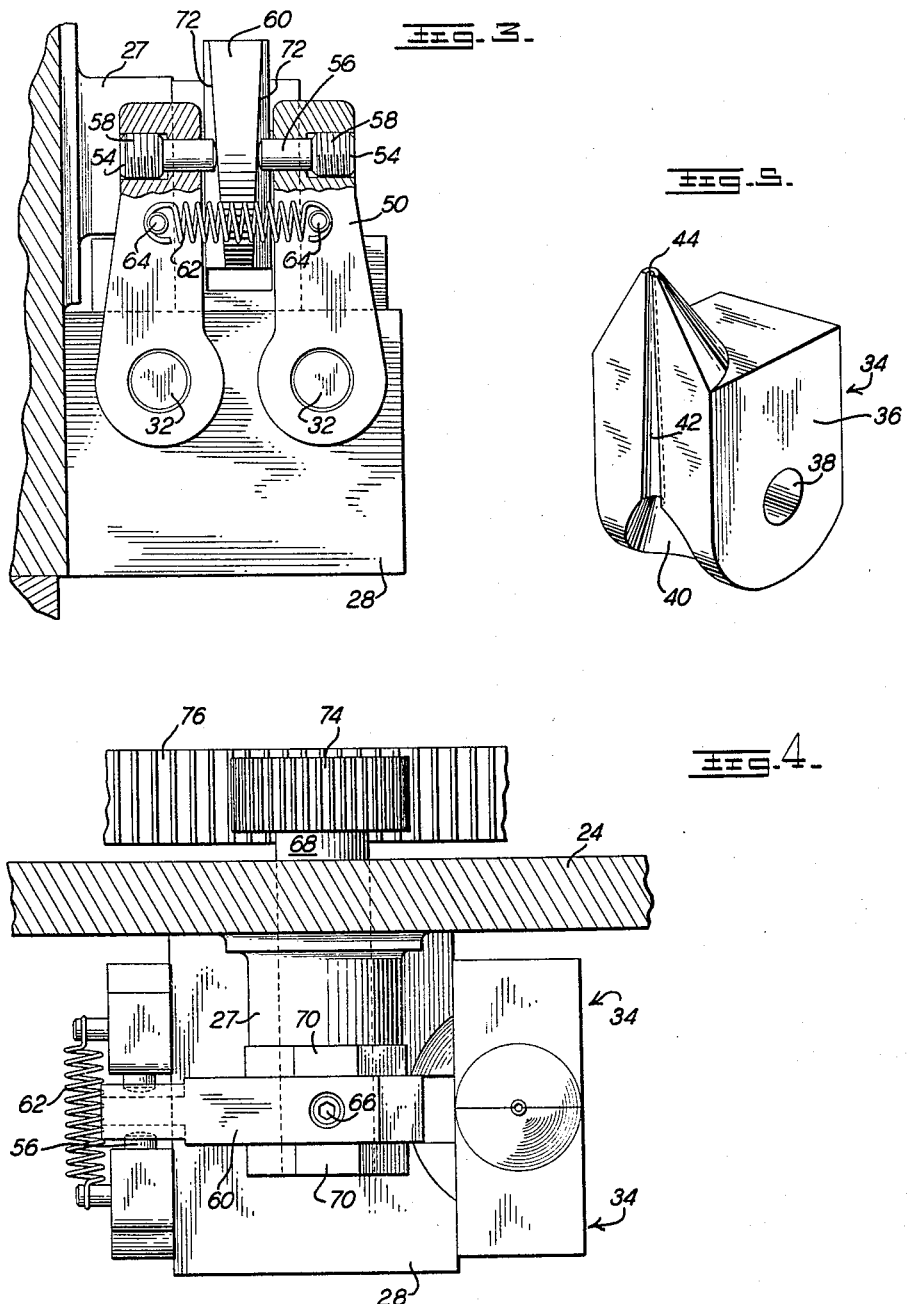
INVENTOR.
LEON MARTUCH
BY Dean Laurence
ATTORNEY

United States Patent Office 2,960,063
Patented Nov. 15, 1960

2,960,063
STRIPPING APPARATUS

Leon P. Martuch, Midland, Mich., assignor to Scientific Anglers, Incorporated, Midland, Mich., a corporation of Michigan Filed July 28, 1958, Ser. No. 751,388

10 Claims. (Cl. 118—102)

This invention relates to coating and stripping apparatus. More particularly, this invention relates to apparatus for applying a coating of varying thickness to the exterior of a line, filament or strand.

It is frequently desired to form a line or filament having a continuously varying diameter or a diameter repetitively varying so that it can be cut into pieces similar to each other. For example, in producing fishing line suitable for fly casting, it may be desired to produce pieces of fishing line of increasing diameter with a relatively light, small diameter end and a heavier, larger diameter end. In casting such a line, the heavy end is thrown away from the angler and its weight carries it outwardly in a long cast. Also, so-called "belly" tapered lines are desired.

According to the present invention, lines having any desired taper can be provided by passing a base line of substantially constant diameter through a bath of viscous plastisol material, wherein a heavy coating of plastisol material adheres to the base line, and passing the coated line through a variable aperture thereby to remove excess plastisol material. The size of the aperture is varied in a predetermined manner to leave a desired thickness of coating material on the base line and thus form a tapered line.

The present invention resides in the concept of apparatus for stripping excess coating material from the surface of a plastisol-coated line comprising a pair of strippers or half-cones having half-conical grooves on their adjacent surfaces; the half-conical grooves being substantially-vertically opposed throughout their lengths; the half-cones being pivotally mounted on stub shafts; means for synchronously pivoting said strippers toward and away from each other to vary the size of the opening at the top formed by said opposed half-conical grooves; the means for synchronously pivoting the strippers comprising lever arms secured to the stub shafts and extending outwardly therefrom; a wedge pivotally mounted and having its opposite inclined faces releasably engaging said lever arms; and means for oscillating the wedge to pivot the lever arms, stub shafts and strippers to vary the size of the opening formed by the opposed half-conical grooves; whereby the thickness of coating material remaining on the line after stripping is varied.

By the term "plastisol," as used herein is meant the thermoplastic compositions known in the art and generally formed from plasticized-polyvinyl chloride or vinyl chloride, vinylidene halide, vinyl cyanide, et cetera, copolymers, with coloring agents, minor quantities of solvents, and other agents which impart flowability in application and desired properties such as cold resistance to the final coating.

It is thus a primary object of the invention to provide apparatus for providing a tapered coating on a line.

It is a further object of the invention to provide a coating device including stripping apparatus comprising half-cones or strippers having opposed half-conical grooves on their inner surfaces forming a top opening for determining the thickness of a coating on a line drawn through the opening, and means for synchronously pivoting the half cones.

A further object of the invention is to provide apparatus for stripping excess fluid coating in varying amounts from a coated line to provide a tapered line.

Further objects and advantages of the invention will be apparent upon reading the following specific description and drawings, wherein:

Figure 3 is an end elevation view, partly in section, taken from the end opposite the end illustrated in Figure 1;

Figure 4 is a top plan view of the coating apparatus illustrated in Figure 1; and Figure 5 is a perspective view of one of the half-cones, or strippers of the apparatus shown in Figure 1.

Figure 1:
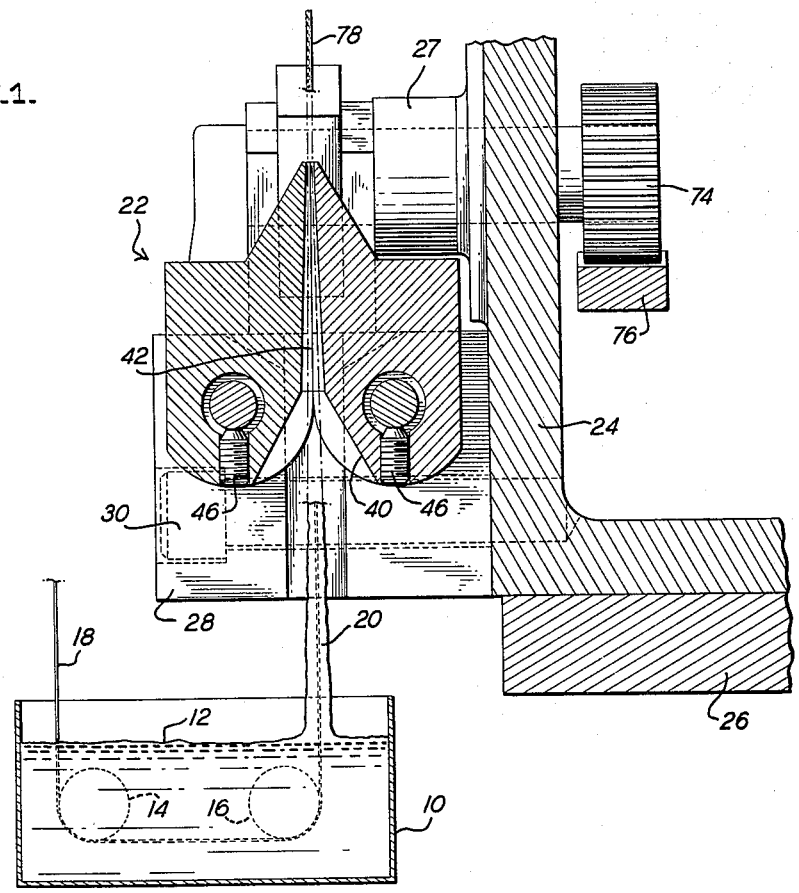
Figure 1 is an end elevation view, partly in section, of a coating apparatus embodying the invention.
Figure 2:
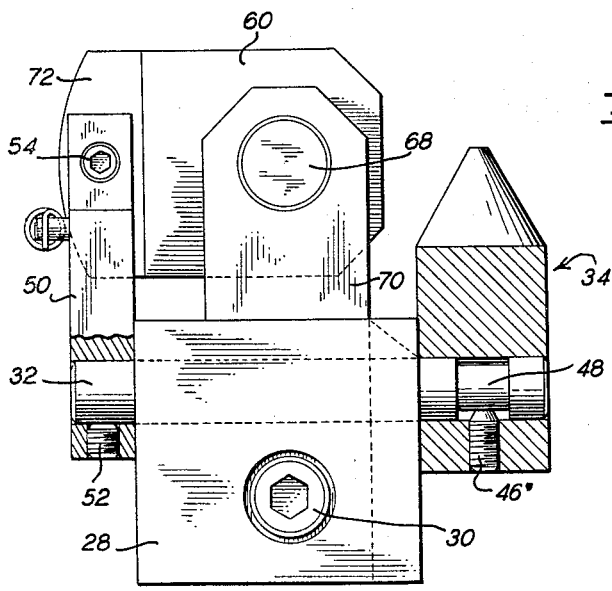
Figure 2 is a side elevation view, partly in section of the coating apparatus illustrated in Figure 1.

In the coating apparatus illustrated in the drawings a tank containing liquid plastisol coating material is provided. The base line is drawn through the tank and acquires a bulky coating of plastisol material.

The line is then passed to a stripping apparatus comprising a mounting with a pair of stub shafts rotatably journaled therein. Half cone members or strippers are secured to adjacent ends of the stub shafts with opposed half-conical grooves forming an opening through which the coated line passes. The thickness of coating material applied to a line is determined by the area of the opening. Lever arms are secured to the adjacent ends of the stub shafts opposite from the strippers. A spring under tension extends between the lever arms and maintains the lever arms in releasable contact with the wedge. A pinion gear is secured to the shaft and engages a rack. Reciprocation of the rack by conventional drive means causes oscillation of the wedge, and pivoting of the lever arms, stub shafts and strippers to vary the size of the opening between the conical grooves.

Following is a specific description of the apparatus illustrated in the drawings. The coating apparatus comprises a tank 10 containing a quantity of liquid coating material 12. Among the coating materials which can be used are plastisols. A pair of reels 14 and 16 are rotatably mounted in tank 10 by conventional means for guiding a base line 18 through the tank where a bulky layer 20 of coating material adheres to the outer surface of base line 18. Conventional drawing means, not shown, are employed to draw the base line through the tank 10 and upwardly through the stripping apparatus generally indicated by the reference number 22.

The stripping apparatus 22 includes a mounting 24 secured to a base 26. A boss 27 is secured to the upper portion of mounting 24 and extends horizontally outwardly therefrom. A block 28 is secured to mounting 24 by a bolt 30.

A pair of parallel stub shafts 32 are positioned for free rotation within parallel holes extending through block 28. Half-cone members, or strippers, generally indicated by the reference numerals 34, are mounted on the adjacent ends of stub shafts 32. Each half-cone member 34 includes a body 36, a hole 38 extending through the body, a lower conical surface 40, and an upper inner half-conical groove 42 terminating at the upper end in a semi-circular opening 44. Each stripper 34 is releasably secured to a stub shaft 32 by a set screw 46 extending through the stripper and engaging a diminished portion 48 of the stub shaft 32.

A pair of lever arms 50 are releasably secured by set screws 52 to the opposite ends of the stub shafts 32. Pins 54 have narrow portions 56 extending from the upper ends of the lever arms 50 and enlarged threaded portions 58 adjustably secured in the lever arms. The pins engage the inclined surfaces of a wedge 60 that is more fully described below. The pins 54 are held releasably in engagement with the wedge 60 by a tension spring 62 extending between studs 64 mounted on the lever arms 50.

The wedge 60 is releasably secured by a set screw 66 to a shaft 68 extending for free rotation through a hole in boss 27. A pair of standards 70 are integral with base 28 and extend upwardly therefrom. Wedge 60 extends between the standards 70. The shaft 68 extends through registering holes in mounting 24, boss 27, standards 70 and wedge 60. Convergingly-inclined surfaces 72 are formed on wedge 60 for engagement by pins 54.

In order to oscillate wedge 60, a pinion gear 74 is secured to the opposite end of shaft 68. A rack 76, a portion of which is shown, engages pinion gear 74. Conventional drive means (not shown) can be employed to reciprocate rack 76.

The operation of the apparatus illustrated in the drawing will now be described. A base line 18 of textile material such as braided thread is drawn by conventional mechanism (not shown) through the tank 10, passes around reels 14 and 16, and moves upwardly out of tank 10 with a bulky coating of plastisol material 20 adhered to the outer surface thereof. The coated line reaches the stripping device 22 and passes into the opening formed by the vertically opposed half-conical grooves 42. The excess viscous coating material is stripped from the base line 18 and falls back into the tank 10. The base line passes through the opening at the upper end of the strippers 34 formed by the semi-circular openings 44 and emerges as a smoothly coated line 78. The thickness of the coating on the line 78 is determined by the minimum area formed between the opposed half-conical grooves 42.

The diameter of coated line 78 is steadily varied by oscillating or pivoting of strippers 34 to enlarge and decrease the opening formed by the half-conical grooves 42. This variation of the opening that determines the thickness of the coating applied to base line 18 is accomplished as follows. Movement of rack 76 by a conventional drive means (not shown) rotates pinion 74 and shaft 68. Wedge 60 rotates with shaft 68 and moves downwardly between lever arms 50. Inclined surfaces 72 of the wedge 60 engage portions 56 of pins 54 to rotate the lever arms and stub shafts 32 synchronously in opposite directions. The strippers 34 are rotated in opposite directions so that the semi-circular openings 44 move away from each other, resulting in an increased thickness of the coating on the coated line 28. The motion of the aforedescribed mechanism is performed at a gradual uniform rate so as to produce a gradual tapering of the coated line 78.

When the maximum thickness of coating has been reached, the taper of the coated line is reversed as follows. The rack 16 is moved in the opposite direction causing rotation of pinion 74 and shaft 68. The wedge 60 is rotated to raise the inclined surfaces 72 from between the lever arms 50. Spring 62 pulls the lever arms 50 inwardly to maintain the narrow portions 56 of pins 54 in pressing engagement with the inclined surfaces 72 of wedge 60. In the course of continued use, as the narrow portions 56 wear, or adjustment is desired, the pins 54 are advanced or retracted within the lever arms 50 by means of the screw threads. The movement of the lever arms together, seen in the upper portion of Figure 3, causes rotation of stub shafts 32 and synchronous rotation of strippers 34 to move the semi-circular openings 44 together and decrease the thickness of the coating on line 78.

There is thus provided an efficient and simple apparatus for applying a tapered coating to a line, filament or thread.

While the invention has been illustrated with a physical embodiment, its scope is limited only by the meaning and range of equivalency of the subjoined claims.

I claim:

1. Apparatus for stripping plastisol material from a coated line comprising: a pair of strippers each of half conical shape and engageable in abutting relation to each other to form a cone; said strippers having opposed half-conical grooves on their adjacent surfaces; said grooves being substantially-vertically opposed throughout their lengths and defining at the apices of said half-conical-shaped strippers a die opening through which a coated line can pass; said strippers being secured to stub shafts; and means for synchronously oscillating said stub shafts to vary gradually the area of said opening.

2. Apparatus for stripping fluid coating material from a coated line comprising: a pair of oscillatable parallel stub shafts; a pair of strippers each of half conical shape secured to adjacent ends of said stub shafts; said strippers being engageable in abutting relation with each other to form a cone and having opposed surfaces with opposed half-conical mating grooves formed therein; said grooves being substantially-vertically opposed throughout their lengths and determining an opening at the apices of said half conical strippers through which a coated line can pass; a pair of lever arms each secured to the ends of said stub shafts opposite from said strippers; a wedge mounted for oscillation and having convergingly inclined surfaces extending between the ends of said lever arms; means resiliently pressing said lever arms into engagement with said convergingly inclined surfaces of said wedge; and, means for oscillating said wedge.

3. Apparatus as set forth in claim 2 and including pins adjustably mounted in said lever arms and engaging said inclined surfaces of said wedge.

4. Apparatus as set forth in claim 2 wherein said surfaces of said strippers have sharply divergent half-conical surfaces beneath said half-conical grooves.

5. In a coating apparatus comprising means for applying a bulky coating of plastic material to a base line and means for stripping a portion of said plastic material from said base line to achieve a smoothly coated line, the improvement which comprises: a pair of oscillatable parallel stub shafts; a pair of strippers secured to adjacent ends of said stub shafts; said strippers having opposed surfaces with opposed half-conical grooves formed therein; said grooves being substantially-vertically opposed throughout their lengths and determining an opening through which a coated line can pass; a pair of lever arms each secured to the ends of said stub shafts opposite from said strippers; a wedge mounted for oscillation and having convergingly inclined surfaces extending between the ends of said lever arms; means resiliently pressing said lever arms into engagement with said convergingly inclined surfaces of said wedge; and, means for rotating said wedge; whereby the rotation of said wedge effects rotation of said lever arms, stub shafts and strippers to vary the area of the opening formed between said opposed half-conical grooves and vary the thickness of the final coating on said base line.

6. Apparatus for stripping fluid coating material from a coated line comprising: a pair of complementary stripper members movable into abutting relation to each other to form a die body; said stripper members having facing surfaces with opposed grooves which define a passage for a coated line through said die body; said grooves terminating in substantially semi-circular cross section at the uppermost surface of said die body to form a die opening which determines the outer diameter of the coated line; the exterior surfaces of said stripper members sloping downwardly from said die opening; and means for moving said stripper members relative to each other to vary the spacing between said facing surfaces and thereby control the size of said die opening.

7. Apparatus for stripping fluid coating material from a coated line comprising: a pair of complementary stripper members movable into abutting relation to each other to form a die body; said stripper members having facing surfaces with opposed grooves which define a passage for a coated line through said die body; said grooves terminating in substantially semi-circular cross section at the uppermost surface of said die body to form a die opening which determines the outer diameter of the coated line; the exterior surfaces of said stripper members sloping downwardly from said die opening; cam follower means movable with said stripper members; and cam means engageable with said cam follower means to vary the spacing between said facing surfaces of said stripper members and thereby control the size of said die opening.

8. Apparatus for stripping fluid coating material from a coated line comprising: a pair of stripper members each of half-conical shape and engageable in abutting relation with each other to form a cone-shaped body; said stripper members having opposed grooves on their facing surfaces to define a passage for a coated line through said body; said grooves terminating in substantially semi-circular cross section at the apices of the half-conical strippers to form a die opening which determines the outer diameter of the coated line; and means for moving said stripper members relative to each other to vary the spacing between said facing surfaces and thereby control the size of said die opening.

9. Apparatus for stripping fluid coating material from a coated line as defined in claim 8 in which said stripper members are pivotally movable relative to each other to vary the spacing between said facing surfaces.

10. Apparatus for stripping fluid coating material from a coated line to provide a line of varying outer diameter comprising: a pair of stripper members each of half-conical shape and engageable in abutting relation to each other to form a cone-shaped body; said stripper members having opposed grooves on their facing surfaces to define a passage for a coated line through said body; said grooves terminating in substantially semi-circular cross section at the apices of the half-conical strippers to form a die opening which determines the outer diameter of the coated line; cam follower means movable with said stripper members; and cam means engageable with said cam follower means to vary the spacing between said facing surfaces of said stripper members and thereby control the size of said die opening.

References Cited in the file of this patent

UNITED STATES PATENTS

| | | |
|---|---|---|
| 930,115 | Alley | Aug. 3, 1909 |
| 1,387,606 | Meyer | Aug. 16, 1921 |
| 2,263,419 | Hamburger | Nov. 18, 1941 |
| 2,862,282 | Beebe | Dec. 2, 1958 |